June 23, 1959 — F. M. DALEY — 2,891,288
ADHESIVE ABSORPTIVE WEATHER STRIP AND METHOD OF MAKING
Filed Sept. 4, 1951 — 2 Sheets-Sheet 1
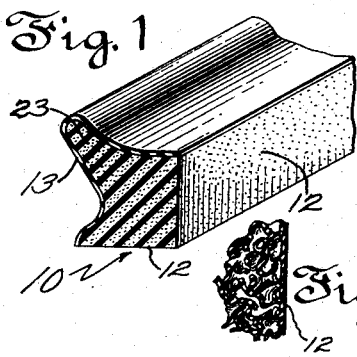
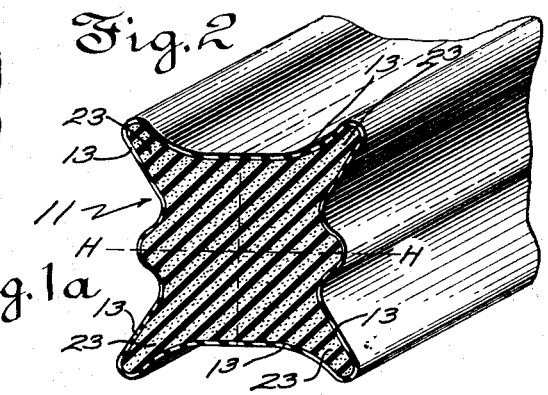
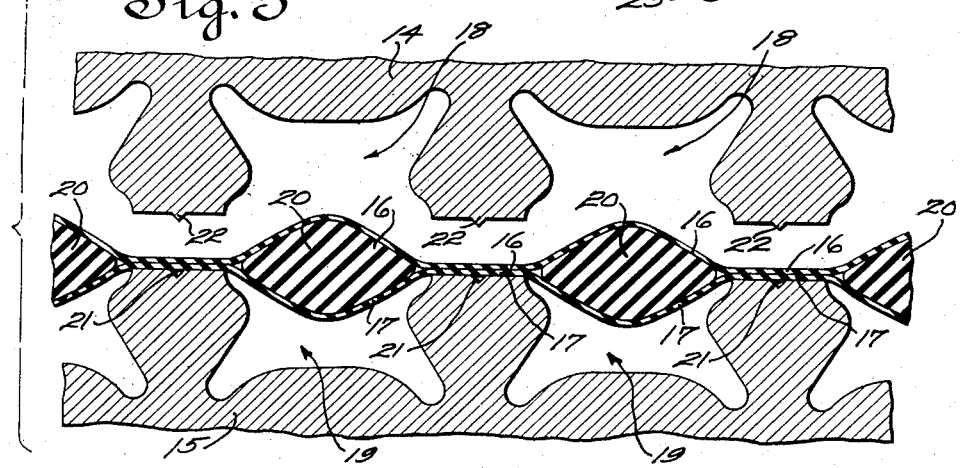
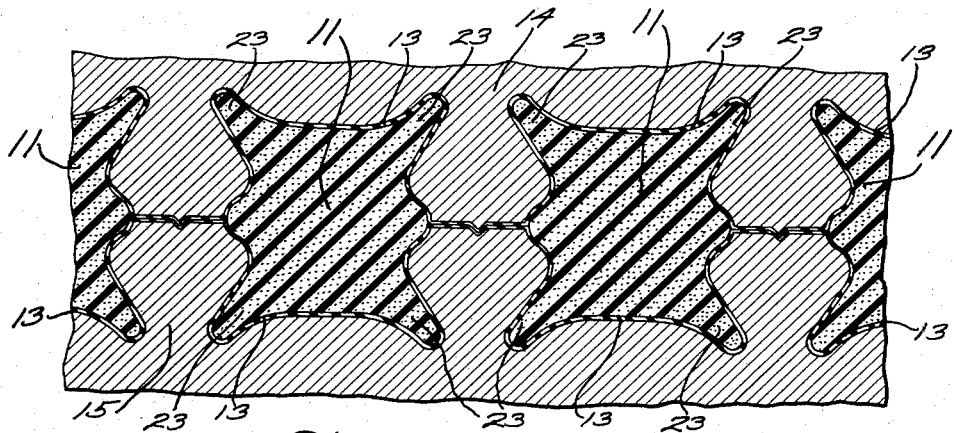
INVENTOR
Frederick M. Daley
BY
ATTORNEY June 23, 1959  F. M. DALEY  2,891,288
ADHESIVE ABSORPTIVE WEATHER STRIP AND METHOD OF MAKING
Filed Sept. 4, 1951  2 Sheets-Sheet 2
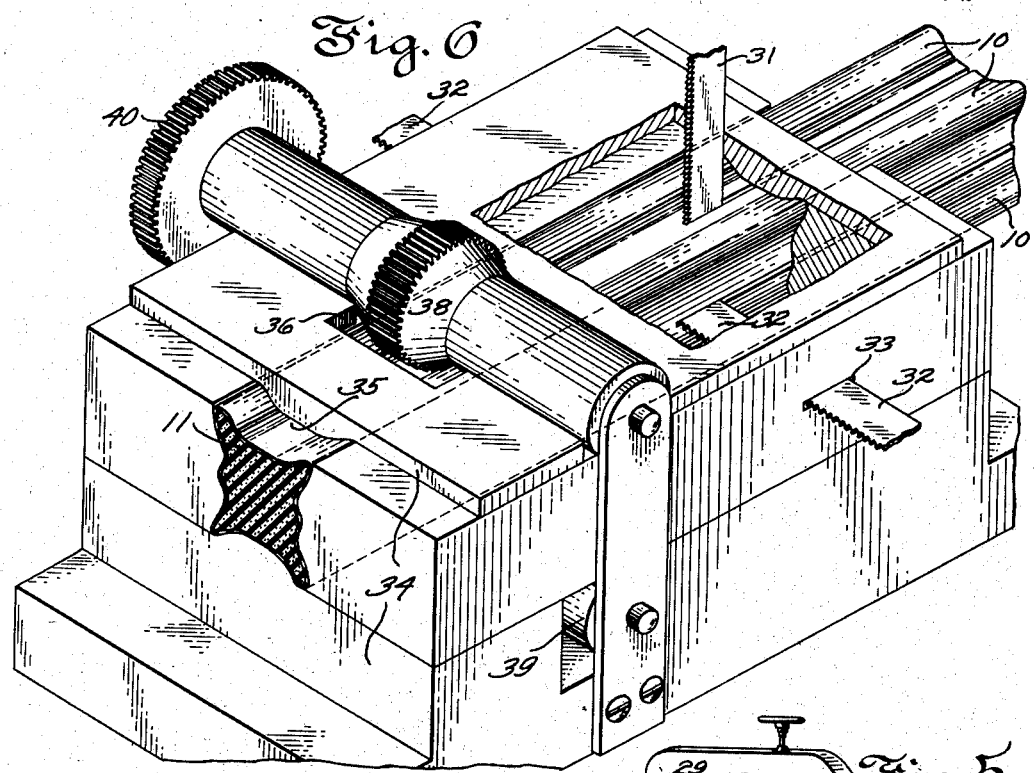
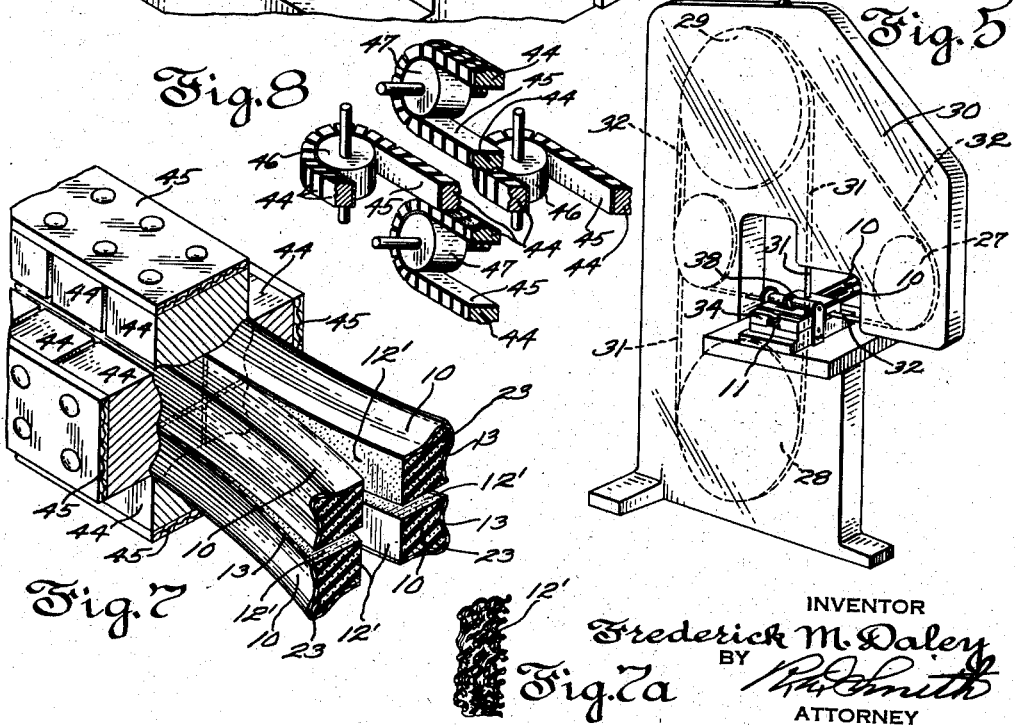
INVENTOR
Frederick M. Daley
BY
ATTORNEY

United States Patent Office 2,891,288
Patented June 23, 1959

2,891,288

ADHESIVE ABSORPTIVE WEATHER STRIP AND METHOD OF MAKING

Frederick M. Daley, Shelton, Conn., assignor, by mesne assignments, to The B. F. Goodrich Company, Akron, Ohio, a corporation of New York Application September 4, 1951, Serial No. 244,885

2 Claims. (Cl. 20—69)

This invention relates to strips of expanded cellular material, for example weather strips for use as a closure seal at the joints of automobile doors, trunk compartment lids, etc. In use, such strips are usually flexible and resilient and have one or more surfaces thereof secured to a means of support by cementing the mounting surface or surfaces of the strip to the marginal framework of the doorway or trunk compartment. The invention also relates to methods of producing such strips of expanded cellular material.

Heretofore strips of sponge rubber, for instance, have commonly been produced by expanding or "blowing" sponge rubber compound by the application of heat while confined in a mold. This causes the compound to expand and vulcanize into a permanent shape of cellular rubber. In this process the external surface of the strip, especially if forced into contact with the hot wall of the mold cavity by the pressure of expansion, becomes smoothly seared over and considerably less porous than is the internal cellular structure of the sponge rubber that constitutes the body of the strip. Such seared-over or considerably sealed condition of the surface is undesirable at the face or faces of a strip that must be bonded, say by rubber cement, to a supporting structure because a flowable adhesive is unable to penetrate and obtain a good foothold in a surface having the considerably closed texture of a smooth molded surface. The same is true if the exterior surface carries an armoring skin of specially applied noncellular or solid material bonded to the cellular body of the strip.

One object of this invention is to provide strips of unstretched sponge rubber or an analogous cellular plastic that is homogeneous throughout the strip, each strip having one or more of its external mounting surfaces fully as porous in texture as is the internal cellular structure of the body of the strip. This permits rubber cement or other flowable adhesive to penetrate copiously into the surface pores of the mounting face of the cellular body of the strip and cling firmly in such pores. The invention enables the strip to be more securely bonded to the surface on which it is mounted than has heretofore been possible to surfaces of strips in which the cells of the expanded material of the strip are covered over and nearly sealed by searing contact of the expanding cellular stock with the heated surface of a mold cavity in which the strip is cured.

Another object is to produce sponge rubber in continuous strip form with certain of its external faces highly porous according to these improvements and with certain other of the exposed or working surfaces of the strip covered with a thin tough skin of solid imperforate material bonded thereto in order to increase the wearing quality of the strip and render it moisture-proof in use.

A further object is to generate as an intermediate product in the manufacture of weather strip a composite strip of expanded cellular material having an all-over considerably imperforate external shurface defining a profile shape of strip that is a composite of intended external cross sectional contours of an even plurality of like component strips into which the composite strip may be divided lengthwise, whereupon when such composite strip is divided into a plurality of such like component strips each of the like component strips shall have one or more highly permeable mounting surfaces defined by a stratum of exposed broken edges of fragmented unstretched dividing walls of its body cells due to the fact that such cells are laid open at such mounting surfaces of the component strips without subjecting them to deforming flexure after curing or vulcanization of the cellular material.

A still further object is to divide the composite shape of strip into individual strips by a sawing, cutting or other splitting operation such that the aforesaid component like strips may be generated simultaneously from the said strip of composite shape.

These and other objects of the invention will appear from the following description of a preferred method and apparatus for carrying out the invention having reference to the accompanying drawings wherein:

Fig. 1 is a perspective view of a common shape of conventional weather strip having, as in the prior art, a mounting face of objectionably poor permeability intended to be remedied by this invention.

Fig. 1a is a sectional view in greatly enlarged detail showing the cell sealing nature of the mounting face in Fig. 1.

Fig. 2 is a perspective view of a composite strip from which some larger number of individual component strips may be produced in improved condition for mounting according to this invention.

Fig. 3 shows suitable cavities in separated mold sections with uncured stock lying therebetween ready to be processed by heat when the mold sections are closed.

Fig. 4 shows the mold sections of Fig. 3 closed together and the blowable material expanded to form the composite strip of Fig. 2.

Fig. 5 shows a strip cutting machine operating to divide the composite strip of Fig. 2 into component strips having the profile shape shown in Figs. 1 and 7.

Fig. 6 is an enlarged perspective view of parts of the machine of Fig. 5 while operating upon the work.

Fig. 7 illustrates traveling carrier shoes which may be used to exert continual pull on the severed strip after it leaves the cutting stage in Fig. 6.

Fig. 7a is a view comparable to Fig. 1a showing the improved condition of mounting face produced by this invention.

Fig. 8 indicates diagrammatically a relationship of continually traveling, endless belts that may carry the strip pulling shoes of Fig. 7.

In Fig. 1 a typical cross sectional shape of sponge rubber weather stripping 10 is shown wherein at least two of its faces 12 are intended to be cemented to channels of conforming shape such as commonly are provided in the margin of the framework of a door, doorway or trunk compartment of an automobile. All other surfaces of the strip in Fig. 1 are covered with a thin tough flexible resilient skin 13 of solid imperforate rubber designed to increase the wearing quality of the working lip 23 of the strip which rubs or becomes squeezed against a closure, as well as to render the working strip surfaces moisture proof in use. The materials might be, instead of rubber, an expandable composition of plasticized polyvinal chloride cured into a cellular elastomeric body with or without a special facing of imperforate skin bonded thereto.

Heretofore the mounting face or faces 12 have not adhered as dependably as is desired to the supporting channels in a framework to which the strip is cemented, owing to restricted ability of the cement to penetrate sufficiently into the considerably impermeable molded surface of the cellular rubber or plastic material. These faces have been considerably impervious in former practice largely because many of the cells of the material become practically closed over at the surface that is vulcanized in contact with the heated wall of the mold cavity. This results in somewhat continuous surface jointure, at the mounting face of the strip, of the thin walls or membranes that separate the internal cells of the sponge rubber, and forms an objectional skin-like covering thereat.

For reasons explained it is desired to make faces 12 as fully penetrable by a liquid adhesive as is the internal cellular structure of the sponge rubber body of the strip. Heretofore it has been proposed to vulcanize sponge rubber strips singly in a mold, remove the seared over and cell closed surface of the vulcanized strip and then distort the strip by flexing it into and holding it in an unnatural stretched shape so as to stretch the cell-dividing walls of the sponge rubber at the surface of the strip and elsewhere.

I have devised a better way to produce an open surfaced strip without stretching any elements of its elastic body and with increased efficiency and lowered cost of production by first molding and vulcanizing a precedent body of sponge rubber having the composite contours shown in Fig. 2. That is to say, the engirdling outline of this shape incorporates a four-time multiple of each of four sections to be divided therefrom or in other words a continuous and repetitive composite of the external contours of all the non mounting or working surfaces 13 of four of the component strips 10 in Fig. 1.

The composite shape of strip 11 in Fig. 2 may be attained by producing it in stationary or traveling mold sections having the cross sectional shape shown in Figs. 3 and 4. In Fig. 3 the upper mold section 14 is separated from the lower mold section 15. There is laid or fed between the open mold sections 14, 15 a lower ply 17 of uncured vulcanizable sheet rubber. Centrally of each cavity 18 in the upper mold, and of each cavity 19 in the lower mold, there is deposited on the lower ply of sheet rubber 17 a continuous strip 20 of uncured sponge rubber compound which thus lies supported in the center of the cavity when the mold sections are closed together as in Fig. 4. Before closing of the mold sections an upper ply 16 of uncured vulcanizable sheet rubber is laid over the strips 20 and rests thereon. Preferably when the mold sections are closed there will be a detentive nipping of the skin forming plies 16 and 17 between a groove 21 and a corresponding ridge 22 in the respective mold sections.

Upon heating of the mold sections, when they are closed together as in Fig. 4, the expansion of sponge rubber compound 20 forces the sheets 16 and 17 into continuous full conformity with the walls of the molds. When vulcanization is complete, this results in the shape of composite molded strip shown in Fig. 2. Its resilient flexibility enables its slender service tongues 23 to be ejected from the conforming corners of the mold cavities in which they have been vulcanized.

According to this invention the composite strip 11 of Fig. 2 is now to be split lengthwise in a plane or planes by any appropriate cutting means such as by severing band saws, band knives, or rotating saws or circular knives, into a plurality of component strips 10, all alike, and each of whose surfaces 12' throughout is of broken texture because consisting of cut-open cells of the interior of the strip body resulting in tiny open cup-like surface hollows. Fig. 7a illustrates this broken texture of surface 12' in contrast to the smooth considerably skinned-over nature of the surface 12 in Fig. 1a. There is thus imparted to what is to be the mounting surface or surfaces of the component strips without permanently stretching the material thereof a porosity capable of admitting to its tiny hollows and crevices a strongly clinging coating of liquid adhesive such as rubber cement when applied thereto. This effects a maximum holding power of the adhesive upon the sponge rubber weather strip 10 and unites it with tenacity to the support surface with which it is to be joined.

Figs. 5 to 8, inclusive, are suggestive of apparatus which may be used to divide the composite strip 11 of Fig. 2 into its component strips 10 of Fig. 1, and illustrate a compound band saw whose frame is designated 30 in Fig. 5. Such band saw may have endless traveling cutting blades 31 and 32, toothed or knife-edged, and which cross each other in close proximity where they act to split the work as shown in Fig. 6. Blades 31 and 32 travel at high speed through clearance slots 33 in the wall of a box structure 34 that affords a work guiding tunnel 35 loosely conforming to the external contours of the traveling composite strip 11.

Additional openings 36 in the top and bottom walls of guide block 34 permit a top work feeding roller 38 and a bottom work feeding roller 39 (not fully shown) to squeeze between them as they rotate the body of composite strip 11 of Fig. 2. By this means the strip is fed constantly from left to right in Fig. 6 as the saw blades 31 and 32 rapidly pass through the sponge rubber and sever its cellular body cleanly into the four component strips 10 of Fig. 7. Rollers 38 and 39 may be driven by means of a power transmission gear 40 and a like power transmission gear in mesh therewith but not herein shown. Pulleys 27, 28 and 29 support and drive the blades.

There may be employed to aid in impelling the work through the band saw after it has become split into the four component strips 10, an apparatus consisting of constantly traveling clamp blocks 44 each mounted on and carried by a flexible endless belt 45. There may be four of these clamp carrying belts 45 divided into a pair that travel respectively about driving pulleys 46 arranged to rotate on vertical axes and another pair of belts 45 that travel respectively about driving pulleys 47 that rotate on horizontal axes. The shafts of these pairs of pulleys will preferably be journaled in bearings (not shown) which may be adjustable toward and away from each other to determine the degree of clutching pressure with which the clamp blocks engage the split composite strip as it leaves the band saw. Or belt backing, non traveling pressor shoes (not shown) may in familiar manner be used to urge the belts against the split composite strip. Beyond the point where the component strips 10 are thus engaged and pulled away from the band saw by clamp blocks 44, the strips are free to separate as shown in Fig. 7. They can thus be diverted into separate receiving stations as they pass beyond the splitting apparatus.

Ways and apparatus by which unlimited lengths of the uncured sheets 16 and 17 of skin forming rubber and correspondingly unlimited lengths of the strips 20 of sponge rubber compound may be prepared and progressively assembled and played off into molds such as 14, 15, if they be traveling molds, are adequately disclosed in United States Patents Nos. 2,315,366 and 2,319,042 and need not be elaborated upon here.

While the present improvements have been explained in connection with a strip composed of a homogeneous body of unstretched sponge rubber, throughout which communicating cells may be produced simultaneously by the internal heat-caused generation of gas, sometimes known as "blowing," strips composed throughout of homogeneous plastic materials made cellular in other ways are equally susceptible of use in practicing the invention, including materials in which communicating cells are produced by chemical reactions without the application of heat, materials which are gas expanded to produce closed or isolated cells, and materials in which cells result from agitating a source liquid into a froth to make so called "foam" or "foam rubber."

Where a skin for the purposes of 13 is to be applied, it need not be applied as in Figs. 3 and 4, but may result from dipping in, or spraying with, settable and preferable vulcanizable substance such as uncured rubber, a core strip of prevulcanized foam rubber or other preformed strip of plastic material. Here the invention has particular usefulness because of the greater practicability of dipping or spraying such strip all over which practice, without the benefits of this invention, would result in the strip possessing only wholly impervious surfaces.

The principles underlying this invention may be practiced on relatively short lengths of strip made in stationary molds and the lengthwise splitting of short strips might be accomplished by hand cutting with a knife or shears but a particular value of the invention lies in its ability greatly to speed production of continuous strips without waste.

Summarizing the principles of the invention referred to there is newly produced and made use of as an intermediate product in the manufacture of multiple continuous lengths of identical weatherstrips a homogeneous body of perforate cellular resilient material that is completely enveloped by a relatively imperforate external surface, said body being newly characterized by having a cross sectional shape which is a composite of four mutually identical component cross sectional shapes of individual weatherstrip into which the intermediate product can be divided lengthwise, the composite cross sectional shape of the intermediate product being delineated by mutually similar curvilinear outlines bounding one side of the tongue 23 and by mutually similar curvilinear outlines different from the first said curvilinear outlines bounding the other side of tongue 23, the symmetry of the said outlines on respectively opposite side of the perpendicularly related cutting planes indicated by broken lines in Fig. 2 enabling the dividing of the article along said planes to produce four identical weatherstrips each having in part a relatively imperforate curvilinear surface and having in part two relatively perforate flat surfaces meeting to form perpendicularly related mounting faces severed from the body of said article.

While to illustrate the principles of the invention in Fig. 2 a composite outline shape has been chosen which is symmetrical in respect to central perpendicularly related cutting planes, the profile shapes of some weather strips lend themselves to being cut from a composite shape that is other than symmetrical, and component strips of respectively differing shapes may be cut simultaneously from a composite shape that is neither four-sided nor characterized by tongue-like corners. The particular composite shape shown in Fig. 2 could be resolved into but two component strips by splitting or dividing it as proposed herein only on the single plane H—H in Fig. 2, wherefore the resulting component strips would each possess two of the working tongues 23 and would have only a single flat mounting surface of the rough character of Fig. 7a.

The appended claims are directed to and intended to cover all variations of the precise product shapes and method steps herein disclosed which come within a broad and fair interpretation of the claim language employed to define the invention.

I claim:

1. A precedent article of manufacture to be divided in a manner to produce simultaneously four weatherstrips each of like profile shape delineating in part a projecting lip coextensive in length with the weatherstrip, said article embodying an elongate body of unstretched homogeneous elastic substance honeycombed by cells whose walls are thin unstretched membranes of said substance, all of the external contours of the full length of said body being completely sheathed in a reinforcing skin of dense elastic substance devoid of cells and conforming to the outline of a profile shape that is symmetrical in relation to perpendicularly related planes intersecting at the center of said shape and that is a repetitive composite of the outlines of four weatherstrips of like profile shape to be cut from the precedent article.

2. An intermediate article of manufacture for producing simultaneously multiple continuous lengths of identical weatherstrips derived from said article, said article having a homogeneous body of perforate cellular resilient material completely enveloped by a relatively imperforate external surface and having a cross sectional shape uniform throughout a continuous length thereof which is a composite of four mutually identical component cross sectional shapes of individual weatherstrip each having said continuous length and into which said intermediate article can be divided lengthwise, said composite shape being delineated in part by mutually similar curvilinear outlines symmetrical on respectively opposite sides of a central plane running lengthwise of the article and being further delineated by outlines differing from the first said outlines but mutually similar and symmetrical on respectively opposite sides of a different central plane perpendicularly intersecting the first said plane lengthwise of the article, whereby dividing said article along said planes produces four identical unsymmetrical weatherstrips each having in part a relatively imperforate curvilinear surface and having in part two relatively perforate flat surfaces meeting to form perpendicularly related mounting faces severed from the cellular body of said article.

References Cited in the file of this patent

UNITED STATES PATENTS

| | | |
|---|---|---|
| 1,756,713 | Vernet | Apr. 29, 1930 |
| 2,078,243 | Harnley | Apr. 27, 1937 |
| 2,190,376 | Daley | Feb. 13, 1940 |
| 2,353,877 | Chollar | July 18, 1944 |
| 2,357,513 | Harmon | Sept. 5, 1944 |
| 2,395,293 | Pfleumer | Feb. 19, 1946 |
| 2,419,322 | Matheny | Apr. 22, 1947 |
| 2,421,625 | Kretschmer | June 3, 1947 |
| 2,528,264 | Coppock et al. | Oct. 31, 1950 |
| 2,698,272 | Clapp et al. | Dec. 28, 1954 |